United States Patent
Chen et al.

(10) Patent No.: US 7,782,783 B2
(45) Date of Patent: Aug. 24, 2010

(54) METHODS AND SYSTEMS FOR CENTRALIZED LINK POWER MANAGEMENT CONTROL (CLMC)

(75) Inventors: Jen-Chieh Chen, Taipei County (TW); Chung-Che Wu, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 237 days.

(21) Appl. No.: 11/836,833

(22) Filed: Aug. 10, 2007

(65) Prior Publication Data

US 2008/0279104 A1 Nov. 13, 2008

(30) Foreign Application Priority Data

May 9, 2007 (TW) ............... 96116450 A

(51) Int. Cl.
H04J 1/16 (2006.01)
(52) U.S. Cl. ............ 370/236; 370/229; 370/235; 713/300; 710/260; 710/262; 710/311
(58) Field of Classification Search ......... 370/229–240; 713/300–375; 710/260, 262, 311
See application file for complete search history.

(56) References Cited

U.S. PATENT DOCUMENTS

| 6,199,134 | B1 * | 3/2001 | Deschepper et al. ........ 710/311 |
| 6,802,015 | B2 * | 10/2004 | Atkinson ..................... 713/322 |
| 6,845,456 | B1 * | 1/2005 | Menezes et al. ............. 713/320 |
| 7,073,082 | B2 * | 7/2006 | Hsu ........................... 713/323 |
| 7,360,101 | B2 * | 4/2008 | Kang .......................... 713/300 |
| 2001/0016892 | A1 * | 8/2001 | Klein .......................... 710/260 |
| 2005/0010715 | A1 * | 1/2005 | Davies et al. ................ 711/100 |
| 2005/0013252 | A1 * | 1/2005 | Ono et al. .................... 370/235 |
| 2005/0015633 | A1 * | 1/2005 | Kang .......................... 713/300 |
| 2005/0093524 | A1 * | 5/2005 | Hsu ........................... 323/234 |
| 2008/0056131 | A1 * | 3/2008 | Balakrishnan et al. ...... 370/232 |

OTHER PUBLICATIONS

Trodden, J. and Anderson, D. HyperTransport System Architecture, MindShare, Inc. Feb. 2003. p. 57.*

* cited by examiner

Primary Examiner—William Trost, IV
Assistant Examiner—Ashil Farahmand
(74) Attorney, Agent, or Firm—Thomas, Kayden, Horstemeyer & Risley

(57) ABSTRACT

A method for centralized link power management control (CLMC), performed by a north-bridge of a processing unit, comprises the following steps. A data transmission status of a bus is monitored. CLMC is activated to configure devices corresponding to the bus in order to speed up data transmission of the bus when detecting that the data transmission status of the bus is continually busy. CLMC is activated to configure devices corresponding to the bus in order to slow down data transmission of the bus when detecting that the data transmission status of the bus is continually idle.

19 Claims, 9 Drawing Sheets

| bit | attribute | preset value | description |
|---|---|---|---|
| 1 | RW1C | 0 | set as 1 when count of idle timer reaches upper limit ($T_{idle}$) |
| 0 | RW1C | 0 | set as 1 when count of busy timer reaches upper limit ($T_{busy}$) |

FIG. 4

| bit | attribute | preset value | description |
|---|---|---|---|
| 23:16 | RW | 0 | specifying CLMC initiation |
| 15:0 | RW | 0 | specifying an address of SMI command register of south-bridge |

METHODS AND SYSTEMS FOR CENTRALIZED LINK POWER MANAGEMENT CONTROL (CLMC)

BACKGROUND

The invention relates to power management, and more particularly, to methods and systems for centralized link power management control (CLMC).

The HyperTransport™ Technology Consortium (HTC) has introduced the HT3 specification containing a new centralized dynamic link configuration feature. The centralized dynamic link configuration feature can dynamically configure device specific link features that affect link power consumption through link management SM commands and an associated LDTSTOP# assertion event for synchronization. Link management SM commands contain a 4-bit link management action field (LMAF). The LMAF code is used for indexing BIOS-programmable link management mode (LMM) registers. For details of the HT3 specification, please see specification HTC20051222-0046-0008, entitled *HyperTransport™ I/O Link Specification Revision* 3.00, established on Apr. 21, 2006.

SUMMARY

A method for centralized link power management control (CLMC) is provided. According to an embodiment, a CLMC method performed by a control unit of a north-bridge comprises the following steps. A data transmission status of a bus is monitored. When it is detected that the data transmission status of the bus is continually busy, centralized link management control is initiated to configure a device corresponding to the bus for speeding up data transmission of the bus. Alternatively, when it is detected that the data transmission status of the bus is continually idle, centralized link management control is initiated to configure a device corresponding to the bus for slowing down data transmission of the bus.

A system for centralized link power management control (CLMC) is also provided. An embodiment of a system for CLMC comprises a processor and a north-bridge connecting to the processor via a bus. The north-bridge comprises a control unit. The control unit monitors a data transmission status of the bus. When it is detected that the data transmission status of the bus is continually busy, centralized link management control is initiated to configure a device corresponding to the bus for speeding up data transmission of the bus. When it is detected that the data transmission status of the bus is continually idle, centralized link management control is initiated to configure a device corresponding to the bus for slowing down data transmission of the bus.

BRIEF DESCRIPTION OF DRAWINGS

The invention will become more fully understood by referring to the following detailed description with reference to the accompanying drawings, wherein:

FIG. 4 is a schematic view of an embodiment of a bit table stored in a data transmission status register;

FIG. 6 is a schematic view of an embodiment of an IO write command format;

DETAILED DESCRIPTION

Figure 1:
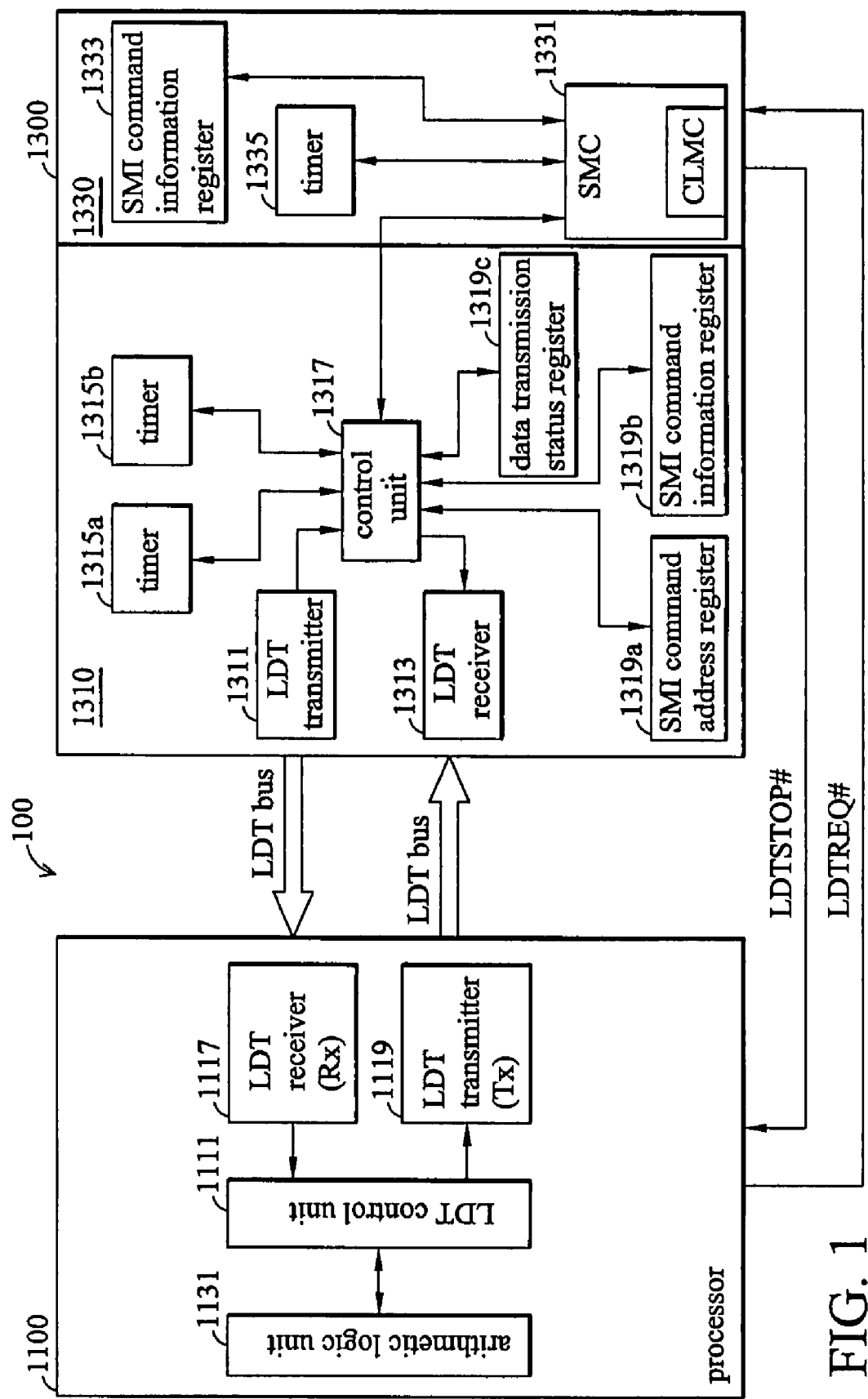
FIG. 1 is a diagram of a hardware environment of an embodiment of a centralized link power management control (CLMC) system.

The Lightning Data Transport (LDT) bus is a bidirectional serial/parallel high-bandwidth, low-latency computer bus. Buses of various widths can be combined into a single application (for example, 2×8 instead of 1×16), which allows for higher speed interconnection between a main memory device and a processor, and lower speed interconnection among other peripheral devices as appropriate in order to reduce power consumption. FIG. 1 is a diagram of a hardware environment of an embodiment of a centralized link power management control (CLMC) system 100, comprising a processor 1100 and a chipset 1300. The chipset 1300 comprises a north-bridge 1310 and south-bridge 1330. The north-bridge 1310 is a controller, transmits/receives data to/from the processor 1100 via a LDT bus.

The processor 1100 comprises an arithmetic logic unit 1131, a LDT control unit 1111, a LDT receiver (Rx) 1117 and a LDT transmitter (Tx) 1119. The north-bridge 1310 comprises a control unit 1317, two timers 1315a and 1315b, a LDT transmitter 1311, a LDT receiver 1313, a system management interrupt (SMI) command address register 1319a, a system management interrupt (SMI) command information register 1319b and a data transmission status register 1319c. The south-bridge 1330 comprises a system management controller (SMC) 1331, a system management interrupt (SMI) command information register 1333 and a timer 1335. Arithmetic logic unit 1131 transmits data between chipset 1300 via a LDT control unit 1111. LDT control unit 1111 receives data from the chipset 1300 via the LDT receiver 1117, and transmits data to the chipset 1300 via the LDT transmitter 1119. The control unit 1317 receives data from the processor 1100 via the LDT receiver 1313, and transmits data to the processor 1100 via the LDT transmitter 1311. The communication between the control unit 1317 and a system management controller 1331 may employ a self-defined bus. The system management controller 1331 comprises a centralized link management controller (CLMC) for performing centralized link management controls.

The SMI command address register 1319a stores an address of the SMI command information register 1333 of south-bridge 1330. The SMI command information register 1319b stores a value indicating initiation of a particular function, for example, a value 30*h* indicates initiation of CLMC. The data transmission status register 1319c stores information specifying a data transmission status of a LDT bus. The control unit 1317 monitors a data transmission status of a LDT bus, when it is detected that the data transmission status of the LDT bus is continually busy, CLMC is initiated to configure a device corresponding to the LDT bus for speeding up data transmission of the LDT bus. On the other hand, for the control unit 1317, when it is detected that the data transmission status of the LDT bus is continually idle, CLMC is initiated to configure a device corresponding to the LDT bus for slowing down data transmission of the LDT bus.

Figure 2:
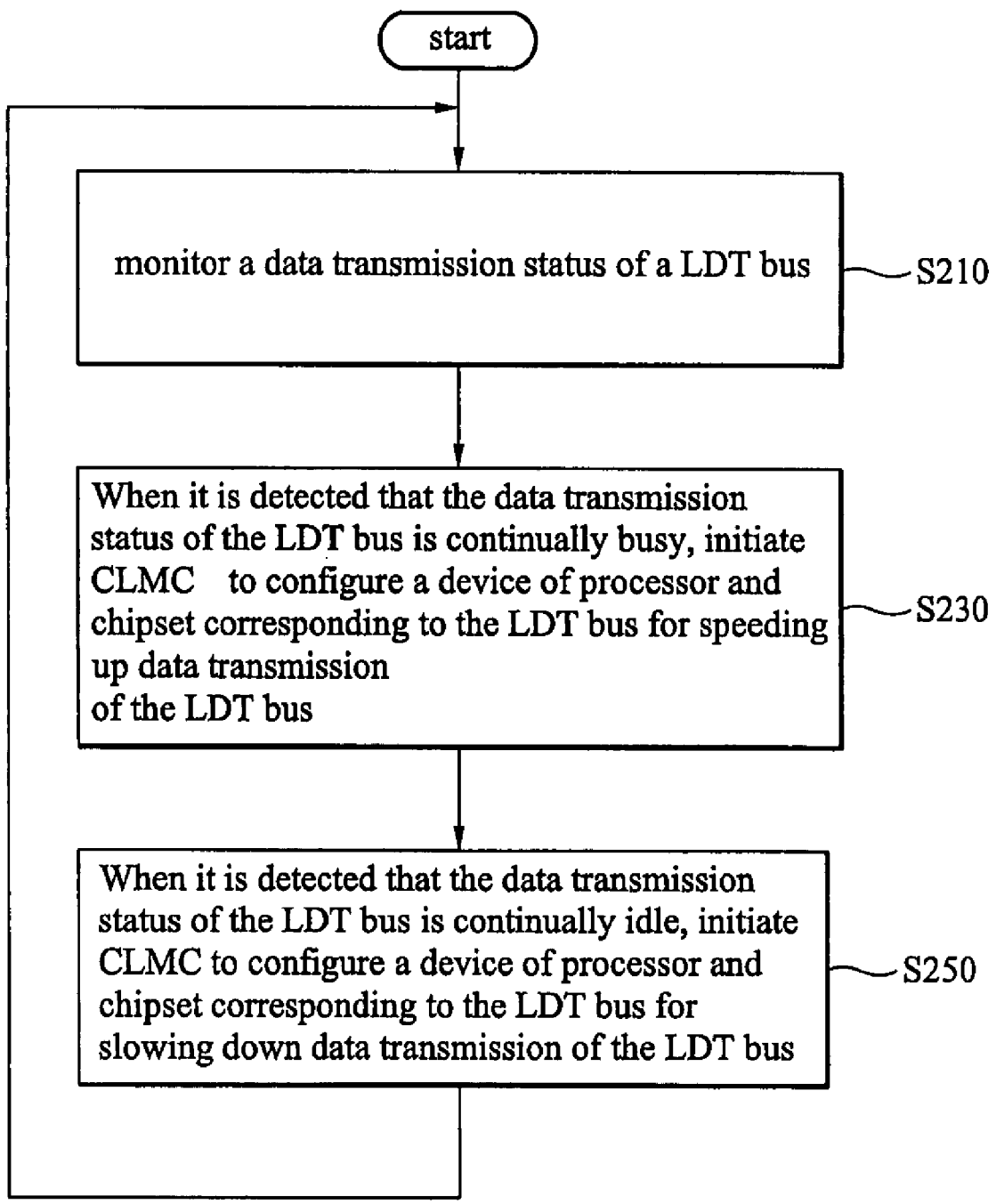
FIG. 2 is a flowchart of an embodiment of a method for centralized link power management control.

FIG. 2 is a flowchart of an embodiment of a method for centralized link power management control performed by control unit 1317 of north-bridge 1310 (as shown in FIG. 1).

The control unit 1317 of north-bridge 1310 monitors a data transmission status of a LDT bus, periodically (step S210). Those skilled in the Art would understand that control unit 1317 may monitor the data transmission status of the LDT bus by monitoring a usage rate of the LDT bus, or by monitoring a first-in-first-out (FIFO) buffer of the LDT transmitter 1311 or LDT receiver 1313. For example, a usage rate of the LDT bus lower than a lower limit specifies that the data transmission status of the LDT bus is at a continually idle state, conversely, a usage rate of the LDT bus higher than an upper limit specifies that the data transmission status of the LDT bus is at a continually busy state. The data transmission status of the LDT bus is at a continually idle state when data to be sent or received of the FIFO buffer is less than a lower limit, conversely, the data transmission status of the LDT bus is at a continually busy state when data to be sent or received of the FIFO buffer is higher than an upper limit. When it is detected that the data transmission status of the LDT bus is continually busy, centralized link management control is initiated to configure a device of processor 1100 and chipset 1300 corresponding to the LDT bus for speeding up data transmission of the LDT bus (step S230). When it is detected that the data transmission status of the LDT bus is continually idle, CLMC is initiated to configure a device of processor 1100 and chipset 1300 corresponding to the LDT bus for slowing down data transmission of the LDT bus (step S250). Those skilled in the Art would understand that power consumption increases when data transmission of the LDT bus speeds up, and power consumption decreases when data transmission of the LDT bus slows down.

Figure 3A:
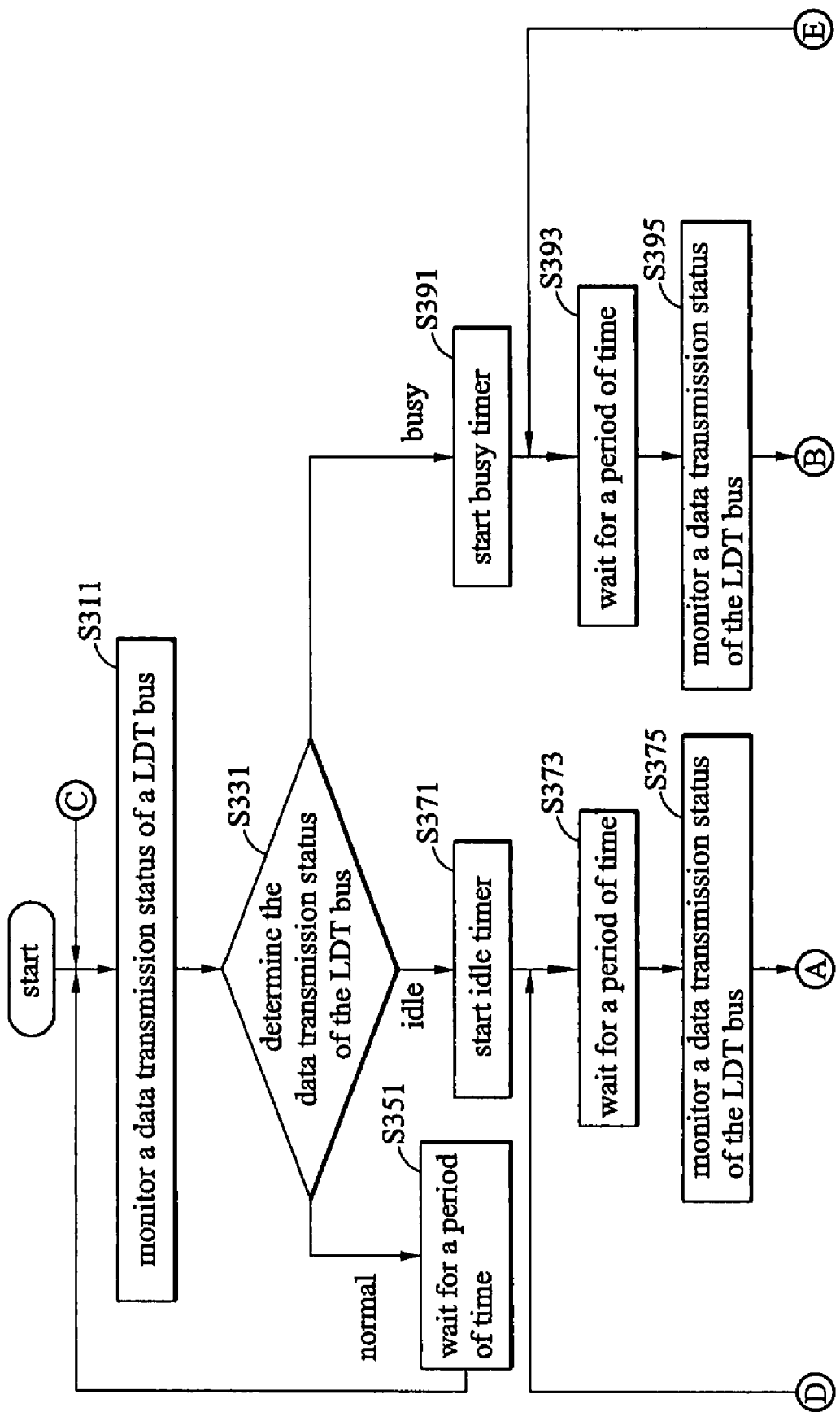
FIGS. 3A and 3B are flowcharts of an embodiment of a method for monitoring data transmission status of the LDT bus.
Figure 3B:
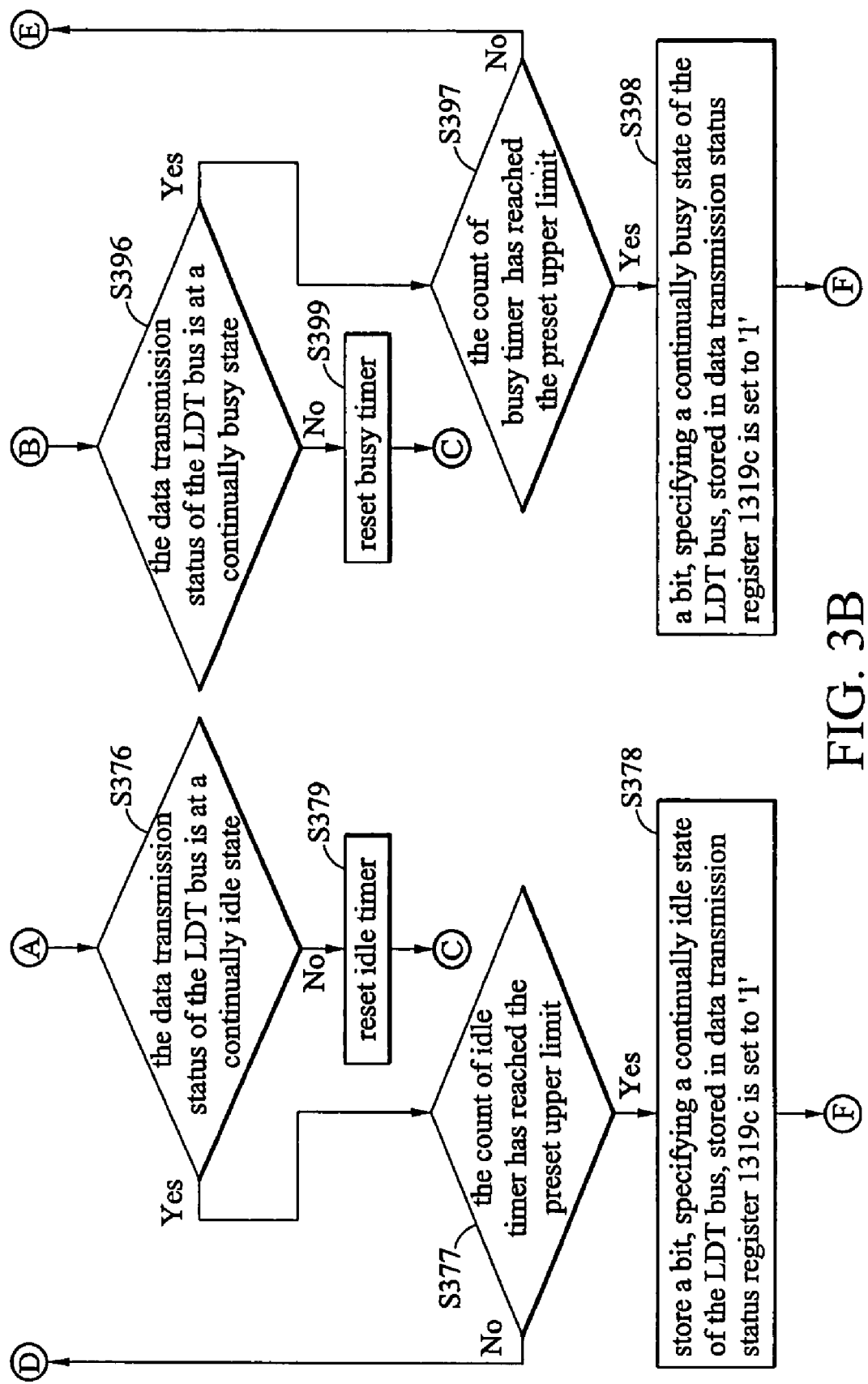

FIGS. 3A and 3B are flowcharts of an embodiment of a method of monitoring a data transmission status of the LDT bus, wherein the method is performed by control unit 1317 of north-bridge 1310 (as shown in FIG. 1). In step S311, a data transmission status of a LDT bus is monitored. In step S331, the data transmission status of the LDT bus is determined, the method proceeds to step S351 when the data transmission status of the LDT bus is at a normal state, the method proceeds to step S371 when the data transmission status of the LDT bus is at a continually idle state, the method proceeds to step S391 when the data transmission status of the LDT bus is at a continually busy state. Those skilled in the Art would understand that control unit 1317 may monitor the data transmission status of the LDT bus by monitoring a usage rate of the LDT bus, or by monitoring a first-in-first-out (FIFO) buffer of the LDT transmitter 1311 or LDT receiver 1313. In step S351, a period of time passes before proceeding to step S311.

Generally, steps S371~379 detect whether the data transmission status of a LDT bus is at a continually idle state, and if so, CLMC is initiated to slow down data transmission of the LDT bus. In step S371, timer 1315a (FIG. 1, also referred to as an idle timer) is started. It should be noted that, after the timer 1315a is started, timer 1315a starts counting, and when a count of timer 1315a reaches a preset upper limit $T_{idle}$, a signal is initiated to notify control unit 1317. In step S373, a period of time passes before proceeding to step S375. Details of steps 375 and S376 can be understood by referring to descriptions pertaining to steps S311 and S331. In step S375, a data transmission status of the LDT bus is monitored. In step S376, it is determined whether the data transmission status of the LDT bus is at a continually idle state, and if so, the method proceeds to step S377, otherwise, to step S379. In step S377, it is determined whether the count of timer 1315a has reached the preset upper limit, and if so, the method proceeds to step S378, otherwise, to step S373. In step S379, timer 1315a is reset, i.e., count of timer 1315a is reset to 0. In step S378, a bit, specifying a continually idle state of the LDT bus, stored in data transmission status register 1319c is set to '1'. FIG. 4 is a schematic view of an embodiment of a bit table stored in a data transmission status register, wherein the 1-bit is set to '1' when the count of timer 1315a reaches the preset upper limit. After step S378 is performed, CLMC is initiated to slow down data transmission of the LDT bus.

Generally, steps S391~399 detect whether the data transmission status of a LDT bus is at a continually busy state, and if so, CLMC is initiated to speed up data transmission of the LDT bus. In step S391, timer 1315b (FIG. 1, also referred to as a busy timer) is started. It should be noted that, after the timer 1315b is started, timer 1315b starts counting, and when a count of timer 1315b reaches a preset upper limit $T_{busy}$, a signal is initiated to notify control unit 1317. In step S393, a period of time passes before proceeding to step S395. Details of steps 395 and S396 can be understood by referring to descriptions pertaining to steps S311 and S331. In step S395, a data transmission status of the LDT bus is monitored. In step S396, it is determined whether the data transmission status of the LDT bus is at a continually busy state, and if so, the method proceeds to step S397, otherwise, to step S399. In step S397, it is determined whether the count of timer 1315b has reached the preset upper limit, and if so, the method proceeds to step S398, otherwise, to step S393. In step S399, timer 1315b is reset, i.e., count of timer 1315b is reset to 0. In step S398, a bit, specifying a continually busy state of the LDT bus, stored in data transmission status register 1319c is set to '1'. Referring to FIG. 4, the 0-bit is set to '1' when the count of timer 1315b reaches the preset upper limit. After step S398 is performed, CLMC is initiated to speed up data transmission of the LDT bus.

Figure 5:
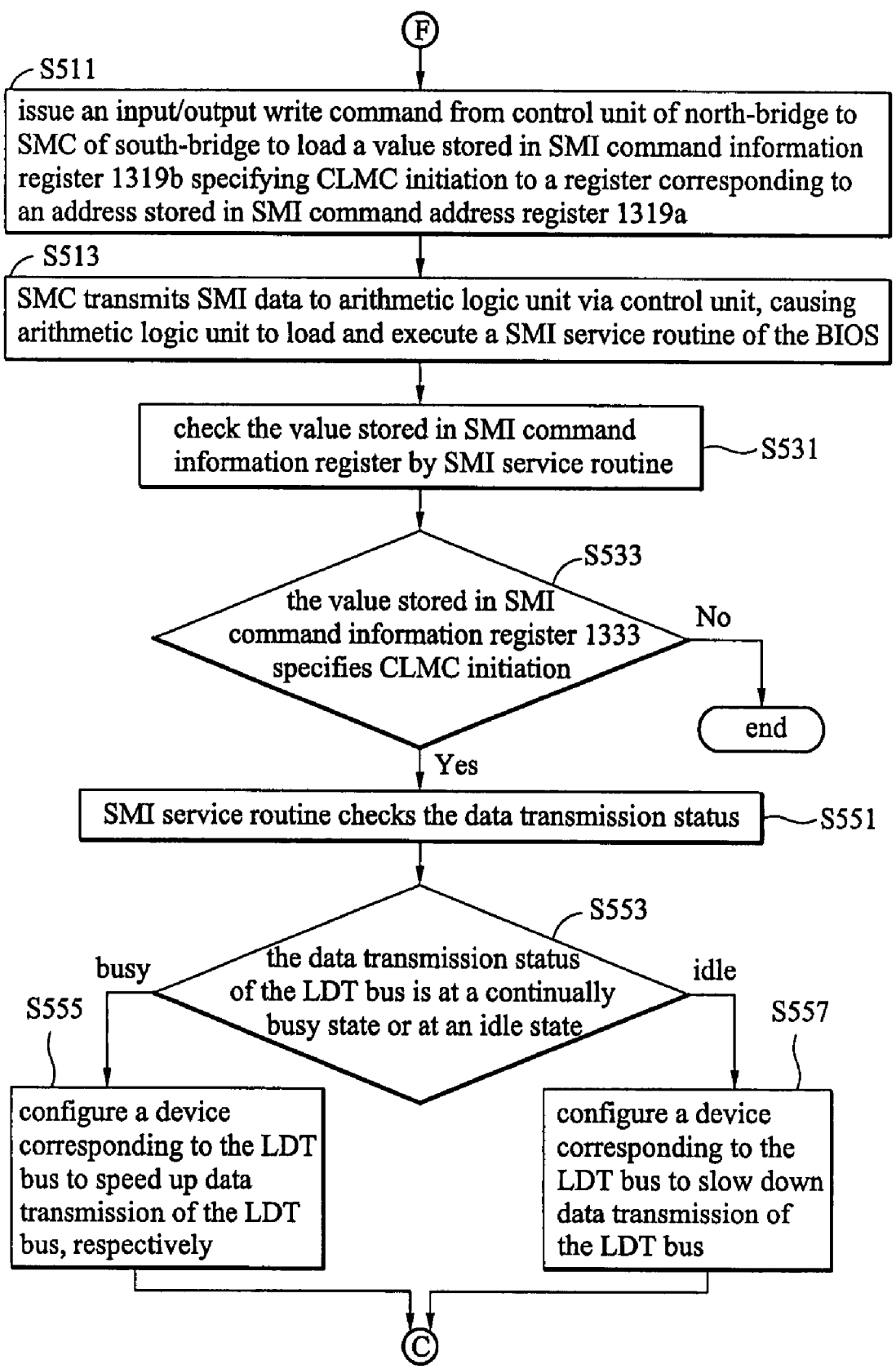
FIG. 5 is a flowchart of an embodiment of a method of CLMC initiation.

FIG. 5 is a flowchart of an embodiment of a method of CLMC initiation. In step S511, an input/output write command is issued from control unit 1317 to system management controller (SMC) 1331 (FIG. 1) to load a value stored in SMI command information register 1319b specifying CLMC initiation, to a register(SMI command information register 1333 shown in FIG. 1) corresponding to an address stored in SMI command address register 1319a. FIG. 6 is a schematic view of an embodiment of an IO write command format, wherein 0-bit~15-bit specify an address of SMI command information register 1333, 16-bit~23-bit comprise a value specifying CLMC initiation. In step S513, system management controller (SMC) 1331 transmits SMI data to arithmetic logic unit 1131 (FIG. 1) via control unit 1317, causing arithmetic logic unit 1131 to load and execute a SMI service routine of the basic input output system (BIOS). Those skilled in the Art would understand that BIOS is a computer program typically stored in non-volatile memory (not shown) of processor 1100 (FIG. 1). The BIOS performs start-up procedures when a computer system is turned on. Two major procedures are typically provided, the first, to determine whether peripheral devices, such as keyboard, mouse, disk drives, video cards, or others, are available, and the second, to load the operating system (OS) into main memory (not shown). After start-up (i.e. a POST stage), the BIOS manages data flow between the OS and the peripherals. In step S531, the value stored in SMI command information register 1333 is checked by SMI service routine. In step S533, it is determined whether the value stored in SMI command information register 1333 specifies CLMC initiation, and if so, the method proceeds to step S551, otherwise, the method ends. Step S533 is performed by the SMI service routine. In step S553, it is determined whether the data transmission status of the LDT bus is at a continually busy state or at an idle state by checking information stored in data transmission status register 1319c (FIG. 1)(S551), when the continually busy state is detected, the method proceeds to step S555, when the idle state is detected, the method proceeds to step S557. Step S553 is performed by the SMI service routine. In step S555, processor 1100 and chipset 1300 configure a device corresponding to the LDT bus to speed up data transmission of the LDT bus, respectively. In step S557, processor 1100 and chipset 1300 configure a device corresponding to the LDT bus to slow down data transmission of the LDT bus, respectively.

Figure 7:
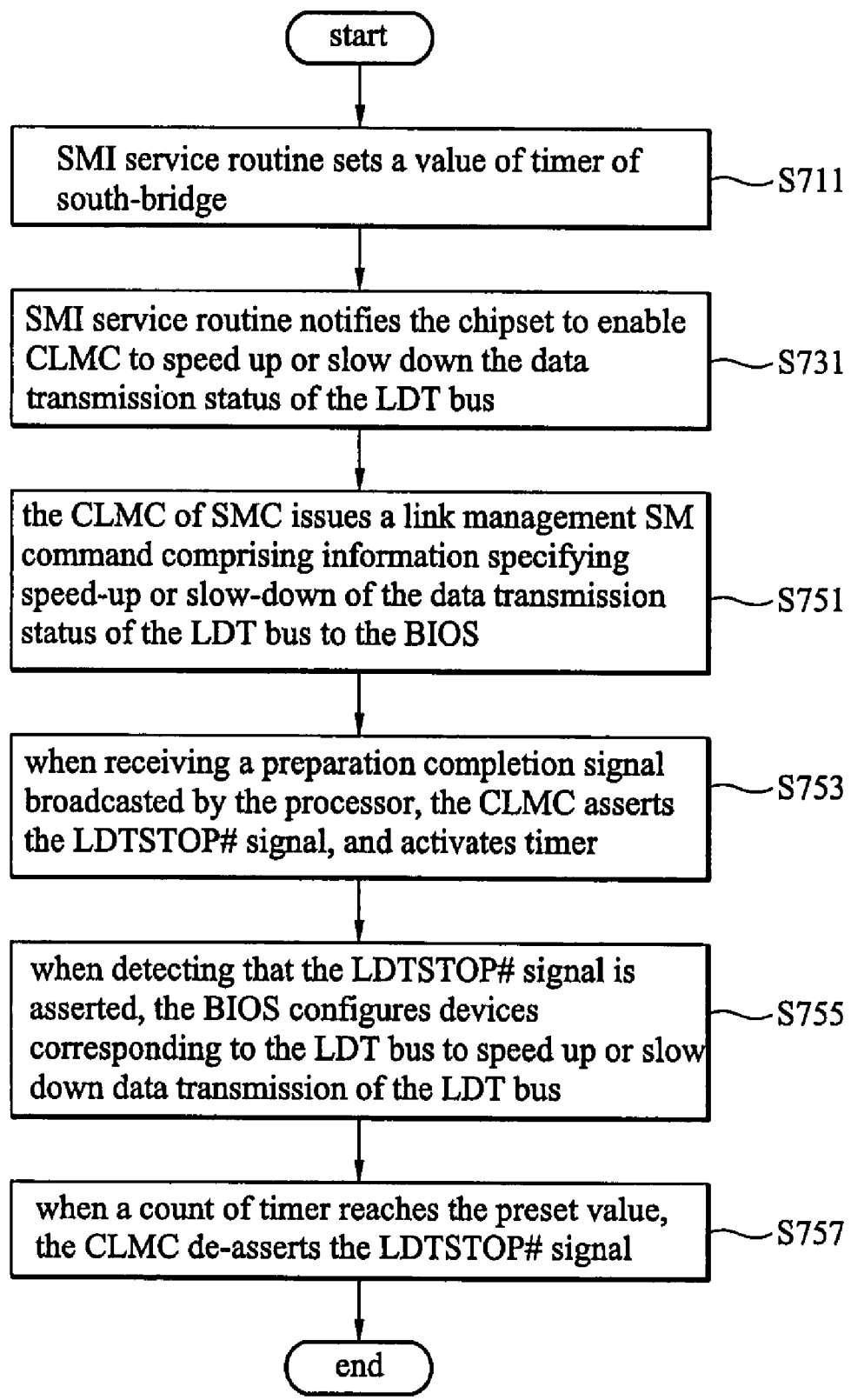
FIG. 7 is a flowchart of an embodiment of a method for adjusting data transmission of the LDT bus.
Figure 8:
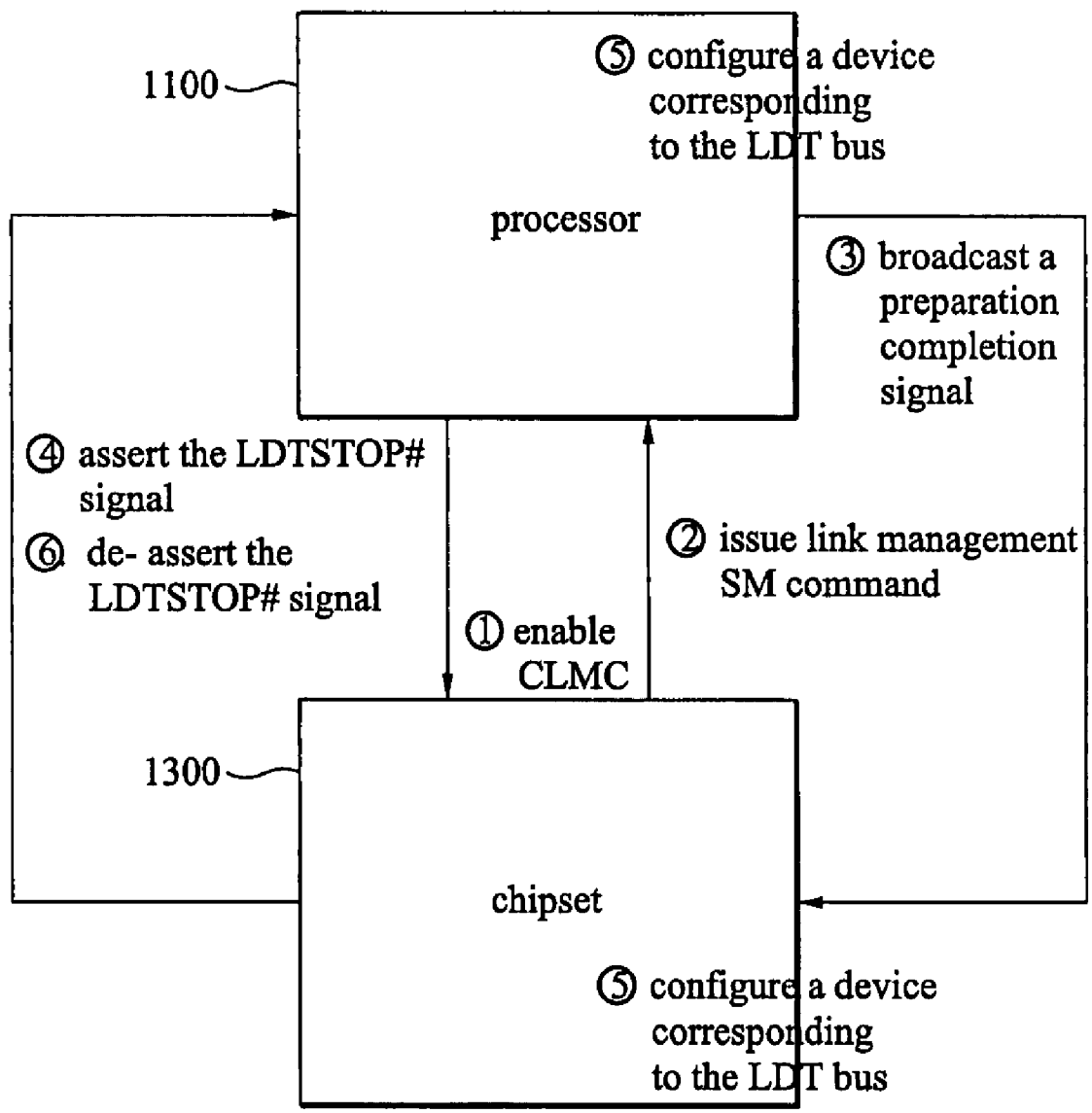
FIG. 8 is a schematic view of an embodiment of a process for adjusting the data transmission of the LDT bus.

FIG. 7 is a flowchart of an embodiment of a method for adjusting data transmission of the LDT bus, disclosing further details of step S555 or S557 of FIG. 5. In step S711, a value of timer 1335 (FIG. 1) of south-bridge 1330 is set by the SMI service routine. It should be noted that, after the timer 1335 is started, timer 1335 starts counting, and when a count of timer 1335 reaches the set value, a signal is initiated to notify system management controller (SMC) 1331. In addition, a time period corresponding to the set value is sufficient for the processor 1100 and chipset 1300 to complete the adjustment of data transmission of the LDT bus. FIG. 8 is a schematic view of an embodiment of a process for adjusting the data transmission of the LDT bus, disclosing further details of step S731 to S757 of FIG. 7. In step S731, the SMI service routine notifies the chipset to enable CLMC to speed up or slow down the data transmission status of the LDT bus. In step S751, the CLMC (FIG. 1) of system management controller (SMC) 1331 issues a link management SM command comprising information specifying speed-up or slow-down of the data transmission status of the LDT bus to the BIOS. In step S753, when receiving a preparation completion signal broadcasted by the processor 1100, the CLMC asserts the LDTSTOP# signal, and activates the timer 1335 (FIG. 1). Those skilled in the Art would understand that, when asserting the LDTSTOP# signal, the processor 1100 and the chipset 1300 cannot transmit data therebetween via the LDT bus. In step S755, when detecting that the LDTSTOP# signal is asserted, the BIOS configures devices corresponding to the LDT bus to speed up or slow down data transmission of the LDT bus. In addition, after asserting the LDTSTOP# signal, the CLMC configures a device corresponding to the LDT bus to speed up or slow down data transmission of the LDT bus. In step S757, when a count of the timer 1335 reaches the preset value, the CLMC de-asserts the LDTSTOP# signal, allowing data transmission to be implemented between the processor 1100 and chipset 1300.

According to some embodiments, a time point for de-asserting the LDTSTOP# signal can be determined other than the timer 1335, thus the step S711 can be omitted. In addition, when it is detected that the LDTREQ# signal is asserted by the processor 1100, the CLMC de-asserts the LDTSTOP# signal. Those skilled in the Art would understand that when data transmission is to be implemented via the LDT bus and the chipset 1300, processor 1100 asserts the LDTREQ# signal.

Certain terms are used throughout the description and claims to refer to particular system components. As one skilled in the Art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method for centralized link power management control (CLMC), performed by a control unit of a north-bridge, comprising:
   monitoring a data transmission status of a data transport bus coupled between a processor and the north-bridge comprising:
      storing a value indicating initiation of CLMC in a first system management interrupt (SMI) command information register;
      storing an information indicating a data transmission status of the data transport bus in a data transmission status register;
      storing an address of a second SMI command information register in a SMI command address register; and
      issuing a command to a system management controller (SMC) for loading the value stored in the first SMI command information register to the second SMI command information register when the data transmission status of the data transmission status is detected being busy or being idle;
   when it is detected that the data transmission status of the data transport bus is busy, initiating centralized link management control to configure a device corresponding to the data transport bus for speeding up data transmission of the data transport bus;
   when it is detected that the data transmission status of the data transport bus is idle, initiating centralized link management control to configure the device corresponding to the data transport bus for slowing down data transmission of the data transport bus.

2. The method as claimed in claim 1, wherein the monitoring step further comprises monitoring a usage rate of the data transport bus, or monitoring a first-in-first-out buffer of a bus transmitter or a bus receiver.

3. The method as claimed in claim 1, wherein the data transmission status of the data transport bus as busy indicates that the data transmission status of the data transport bus is periodically detected as busy during a time period beginning from a time when a busy timer is initiated to a time when a count of the busy timer exceeds a preset upper limit.

4. The method as claimed in claim 1, wherein the data transmission status of the data transport bus as idle indicates that the data transmission status of the data transport bus is periodically detected as idle during a time period beginning from a time when an idle timer is initiated to a time when a count of the idle timer exceeds a preset upper limit.

5. The method as claimed in claim 1, wherein the data transport bus is a lightning data transport bus.

6. A computer system for centralized link power management control (CLMC), comprising:
   a processor;
   a data transport bus;
   a north-bridge, coupled to the processor through the data transport bus, comprising:
      a control unit;
         a system management interrupt (SMI) command address register;
         a first SMI command information register storing a value indicating initiation of CLMC; and
         a data transmission status data register storing an information indicating a data transmission status of the data transport bus by the control unit; and
   a south-bridge, connected to the north-bridge, comprising:
      a system management controller (SMC); and a second SMI command information register, the SMI command address register stores an address of the second SMI command information register, wherein the control unit monitors the data transmission status of the data transport bus, and issues a command to the SMC for loading the value of the first SMI command information register to the second SMI command information register when the control unit is detected that the data transmission status of the data transport bus is busy or is idle, when the control unit is detected that the data transmission status of the data transport bus is busy, initiating centralized link management control to configure a device corresponding to the data transport bus for speeding up data transmission of the data transport bus, when it is detected that the data transmission status of the data transport bus is idle, initiating centralized link management control to configure a device corresponding to the data transport bus for slowing down data transmission of the data transport bus.

7. The computer system as claimed in claim 6, wherein the data transport bus is a lightning data transport bus.

8. The computer system as claimed in claim 6, wherein the north-bridge further comprises:
a bus transmitter; and
a bus receiver,
wherein the control unit further monitors the data transmission status of the data transport bus by monitoring a usage rate of the data transport bus, or by monitoring a first-in-first-out buffer of the bus transmitter or the bus receiver.

9. The computer system as claimed in claim 6, wherein the north-bridge further comprises a busy timer, and the data transmission status of the data transport bus as busy indicates that the data transmission status of the data transport bus is periodically detected as busy during a time period beginning from a time when the busy timer is initiated to a time when a count of the busy timer exceeds a preset upper limit.

10. The computer system as claimed in claim 6, wherein the north-bridge further comprises an idle timer, and the data transmission status of the data transport bus as idle indicates that the data transmission status of the data transport bus is periodically detected as idle during a time period beginning from a time when the idle timer is initiated to a time when a count of the idle timer exceeds a preset upper limit.

11. The computer system as claimed in claim 6, wherein the south-bridge further comprising:
a centralized link power management controller,
the centralized link power management controller detects the value indicating initiation of CLMC is stored to the second SMI command information register, the centralized link power management controller transmits SMI information to the processor to cause the processor to implement the SMI service routine, thereby the centralized link power management control is initiated by the SMI service routine.

12. The computer system as claimed in claim 11, wherein the SMI service routine, after verifying that the value indicating initiation of CLMC has been stored in the second SMI command information register, detects that the data transmission status of the data transport bus is busy by reading the information stored in the data transmission status register, and notifies the centralized link power management controller to speed up data transmission of the data transport bus.

13. The computer system as claimed in claim 12, wherein the south-bridge further comprises a timer, and the SMI service routine: when it is detected that the data transmission status of the data transport bus is busy, a value is determined for the timer, and the centralized link power management controller, after receiving notification from the SMI service routine, the timer is initiated and asserts a signal, the basic input output system, after detecting the asserted signal, configures a device of the processor corresponding to the data transport bus to speed up data transmission of the data transport bus, the centralized link power management controller, after asserting the signal, configures a device of the north-bridge corresponding to the data transport bus to speed up data transmission of the data transport bus, the centralized link power management controller de-asserts the signal when detecting a count of the timer reaches the value, and the processor and the north-bridge not performing data transmission using the data transport bus when the signal is asserted.

14. The computer system as claimed in claim 13, wherein the signal is a LDTSTOP# signal.

15. The computer system as claimed in claim 12, wherein the centralized link power management controller, after receiving notification from the SMI service routine, initiates the timer and asserts a first signal, the basic input output system, after detecting the asserted first signal, configures a device of the processor corresponding to the data transport bus to speed up data transmission of the data transport bus, the centralized link power management controller, after asserting the first signal, configures a device of the north-bridge corresponding to the data transport bus to speed up data transmission of the data transport bus, the centralized link power management controller de-asserts the signal when detecting a second signal asserted by the processor, the processor and the north-bridge not performing data transmission using the data transport bus when the first signal is asserted, and the processor performing data transmission using the data transport bus when the second signal is asserted.

16. The computer system as claimed in claim 15, wherein the first signal is a LDTSTOP# signal, and the second signal is a LDTREQ# signal.

17. The computer system as claimed in claim 11, wherein the SMI service routine, after verifying that the value indicating initiation of CLMC has been stored in the second SMI command information register, detects that the data transmission status of the data transport bus is idle by reading the information stored in the data transmission status register, and notifies the centralized link power management controller to enable the centralized link power management control to slow down data transmission of the data transport bus.

18. The computer system as claimed in claim 17, wherein the south-bridge further comprises a timer, and the SMI service routine: when it is detected that the data transmission status of the data transport bus is idle, a value for the timer is determined, and the centralized link power management controller, after receiving notification from the SMI service routine, initiates the timer and asserts a LDTSTOP# signal, the basic input output system, after detecting the asserted LDTSTOP# signal, configures a device of the processor corresponding to the data transport bus to slow down data transmission of the data transport bus, the centralized link power management controller, after asserting the LDTSTOP# signal, configures a device of the north-bridge corresponding to the data transport bus to slow down data transmission of the data transport bus, the centralized link power management controller de-asserts the LDTSTOP# signal when detecting a count of the timer reaches the value, and the processor and the north-bridge not performing data transmission using the data transport bus when the LDTSTOP# signal is asserted.

19. The computer system as claimed in claim 17, wherein the centralized link power management controller, after receiving notification from the SMI service routine, initiates the timer and asserts a LDTSTOP# signal, the basic input output system, after detecting the asserted LDTSTOP# signal, configures a device of the processor corresponding to the data transport bus to slow down data transmission of the data transport bus, the centralized link power management controller, after asserting the LDTSTOP# signal, configures a device of the north-bridge corresponding to the data transport bus to slow down data transmission of the data transport bus, the centralized link power management controller de-asserts the LDTSTOP# signal when detecting a LDTREQ# signal asserted by the processor, the processor and the north-bridge not performing data transmission using the data transport bus when the LDTSTOP# signal is asserted, and the processor performing data transmission using the data transport bus when the LDTREQ# signal is asserted.

* * * * *